United States Patent
Nagy et al.

(10) Patent No.: US 9,648,462 B2
(45) Date of Patent: May 9, 2017

(54) METHOD FOR TRACKING OF MOTION OF OBJECTS ASSOCIATED WITH WIRELESS COMMUNICATION DEVICES WITHIN A PREDEFINED AREA

(71) Applicants: Sándor Nagy, Szeged (HU); Tibor Gyimóthy, Szeged (HU); Márk Jelasity, Szeged (HU); Vilmos Bilicki, Szeged (HU); Ádám Végh, Szeged (HU)

(72) Inventors: Sándor Nagy, Szeged (HU); Tibor Gyimóthy, Szeged (HU); Márk Jelasity, Szeged (HU); Vilmos Bilicki, Szeged (HU); Ádám Végh, Szeged (HU)

(73) Assignee: SZEGEDI TUDOMÁNYEGYETEM, Szeged (HU)

( * ) Notice: Subject to any disclaimer, the term of this patent is extended or adjusted under 35 U.S.C. 154(b) by 37 days.

(21) Appl. No.: 14/556,176

(22) Filed: Nov. 30, 2014

(65) Prior Publication Data
US 2016/0183059 A1   Jun. 23, 2016

Related U.S. Application Data

(60) Provisional application No. 62/085,361, filed on Nov. 28, 2014.

(51) Int. Cl.
*H04W 4/02* (2009.01)
*H04W 64/00* (2009.01)
(Continued)

(52) U.S. Cl.
CPC ............ *H04W 4/028* (2013.01); *H04B 17/27* (2015.01); *H04B 17/318* (2015.01)

(58) Field of Classification Search
None
See application file for complete search history.

(56) References Cited

U.S. PATENT DOCUMENTS

| | | |
|---|---|---|
| 2008/0089298 A1 | 4/2008 | Anschutz et al. |
| 2012/0115475 A1 | 5/2012 | Miyake et al. |

(Continued)

OTHER PUBLICATIONS

Tracking Unmodified Smartphones Using Wi-Fi Monitors by Musa et al., dated Nov. 2012.*

*Primary Examiner* — Daniel Lai
(74) *Attorney, Agent, or Firm* — Jason D. Voight (57) ABSTRACT

A method for tracking the movement and trajectory of objects associated with wireless devices, located in a predefined area, wherein transceiver nodes communicating with the monitored wireless communication devices are formed, the objects associated with wireless communication device entering or located in the range of the transceiver nodes are detected by said transceiver nodes and relevant collected data are processed by measuring the strength of the signal emitted by the object during communication by at least two access points, converting the measured signal strength data into a vector set, selecting and filtering out the objects that are communicating but make no movement by evaluating the vector set, and analyzing the movement of the communicating objects changing their place by applying a predefined mathematical model. Access points operating according to a small-range "peer-to-peer" (P2P) type wireless communication standard are used as transceiver nodes.

17 Claims, 6 Drawing Sheets

(51) Int. Cl.
*H04B 17/318* (2015.01)
*H04B 17/27* (2015.01)

(56) References Cited

U.S. PATENT DOCUMENTS

| 2012/0129460 A1* | 5/2012 | Hodis ................... G01S 19/48 455/67.11 |
| 2014/0045519 A1 | 2/2014 | Imafuku et al. |
| 2016/0174049 A1* | 6/2016 | Levy ................... G08G 1/0112 455/456.5 |

* cited by examiner

METHOD FOR TRACKING OF MOTION OF OBJECTS ASSOCIATED WITH WIRELESS COMMUNICATION DEVICES WITHIN A PREDEFINED AREA

This application claims priority to provisional application Ser. No. 62/085,361, filed Nov. 28, 2014, the entire disclosure of which is hereby incorporated by reference.

The invention relates to tracking of the motion and trajectory of objects associated with wireless communication devices, within predefined areas. In particular, the invention relates to the determination of the flow rate, within predefined areas, of devices, entities classified into diverse transport categories, by estimating various movements in free areas, roads and streets and determining the expected speed of progress, and the assignment of the entities concerned into transport groups.

BACKGROUND OF THE INVENTION

Measurement takes place by tracing the mobile phone devices of the traffic participants by monitoring the WIFI-capable devices present in the given area.

Localisation based on passive wireless communication—e.g. WIFI—is not a recent idea. A known solution is presented in: A. B. M. Musa and Jacob Eriksson: "Tracking Unmodified Smart-phones Using Wi-Fi Monitors", published in 2012, available inter alia on the following website: http://www.engr.uic.edu/pub/Bits/Musa/musa-eriksson-sensys12.pdf.

The objective of the present invention is to create a method that is simpler, more reliable and at the same time cheaper than the known ones, capable of providing a reliable answer to the question concerning the intensity and main directions of passenger or motor vehicle traffic in a predefined, designated area, and the distribution of the traffic participants by said categories. Our objective is, moreover, to produce such results by this method as can be applied universally for making analyses and statistics, and to project a comprehensive review of the traffic of a chosen site in the monitored period. A further objective of present invention is to monitor individual objects, entities, and to make available the monitoring results without the potential disclosure of any specific personal data, in conformity with the various data protection requirements and regulations.

BRIEF SUMMARY OF THE INVENTION

The present invention is based on the recognition that the objective can be realised by taking as a basis the existing unique and unalterable identifier of any integrated or associated small-range wireless communication device of moving objects—in other equivalent words, entities —, and modifying said identifier after detection in a manner that the device should remain clearly assigned to the identifier, but the identifier should grant adequate anonymity during further processing and utilisation.

One of the main features and advantages of the method according to the present invention is its being a passive solution that does not require to run a special code on the devices of the traffic participants that would either perform active analysis or supply information on a regular basis to a server. For this purpose the presence of a wireless communication client is utilized, e.g. WIFI client, integrated of necessity in the device, e.g. smart phone, carried by the moving object or entity which, under certain—default case—circumstances keeps looking for connection with the WIFI access points anyway, and therefore its presence can be established in a particular area. Based on the signal strength of the WIFI client measured at access points, it is possible to estimate its distance from one or more measuring points.

This task has been solved by a method according to the features described herein. Preferred embodiments of the invention are described herein. In what follows, the invention will be presented in more detail with reference to the enclosed drawings illustrating exemplary embodiments of the proposed method.

DETAILED DESCRIPTION OF THE INVENTION

In the following the method according to the present invention will be presented in relation to a system using WIFI protocol as small-range communication protocol. In the description, the term "access point" or "AP" will be used essentially in connection with WIFI network communication; the term "mesh" in connection with the architecture, and "peer" in connection with peer computing, i. e. a calculation method, in connection with a graph node. The method requires the installation of several, preferably many, intelligent WIFI access points (hereinafter: AP) in adequate density, something that can be done relatively cheaply. The intelligent access point is capable, on the one hand, to collect and process local information and measurement data concerning the devices to be monitored, and, on the other hand, to form a WIFI network with the other access points that provides for low bandwidth communication covering the area throughout a system implementing the proposed method. With this method, one may minimise the traffic by on-site processing and local P2P communication and, on the other hand, enhance the protection of personal data. It is possible to retrieve such high-level information as the movement speed of entity types of different categories along a given trajectory in a given segment, or an estimated number of items. The present invention realises data collection, data analysis and evaluation without the need of any central server, in a P2P (Peer to Peer) way, as is disclosed e.g. in the document https://www.cs.uic.edu/pub/Bits/Musa/musa-eriksson-sensys12.pdf (Musa et al., "Tracking Unmodified Smartphones Using Wi-Fi Monitors", SenSys'12, November 2012).

The shown exemplary implementation of the method according to the present invention, shown here merely as a preferred embodiment, can be divided into two phases. The first, preparatory, phase is to be implemented once, during the assessment of the detected signal strengths and the consequent assignment of WIFI clients—any device suitable for the given wireless communication, e.g. smartphone—to a WIFI access point. During Phase 1, a model, e.g. a machine learning method, is constructed automatically on the basis of the signal strength measurement results that can predict, on the basis of the signal strength of the measured WIFI client, the access point to which the WIFI client is closest. To prevent the full-scale identification of a device, the monitored identification parameter of the device—in the present example its MAC address—will be anonymised. This can be solved by using a method, known to those skilled in the art, that provides for a unidirectional and clear assignment, for example, MD5.

The second, phase—phase of use—relies on the previous model to calculate holding speed, average speed and movement history on a continuous basis with the P2P methodology, and to estimate on their basis and based on their correlation and analysis the type of the moving object (pedestrian, private or public transport passenger) emitting the detected WIFI signal, provided that WIFI is used for small-range communication.

Figure 1:
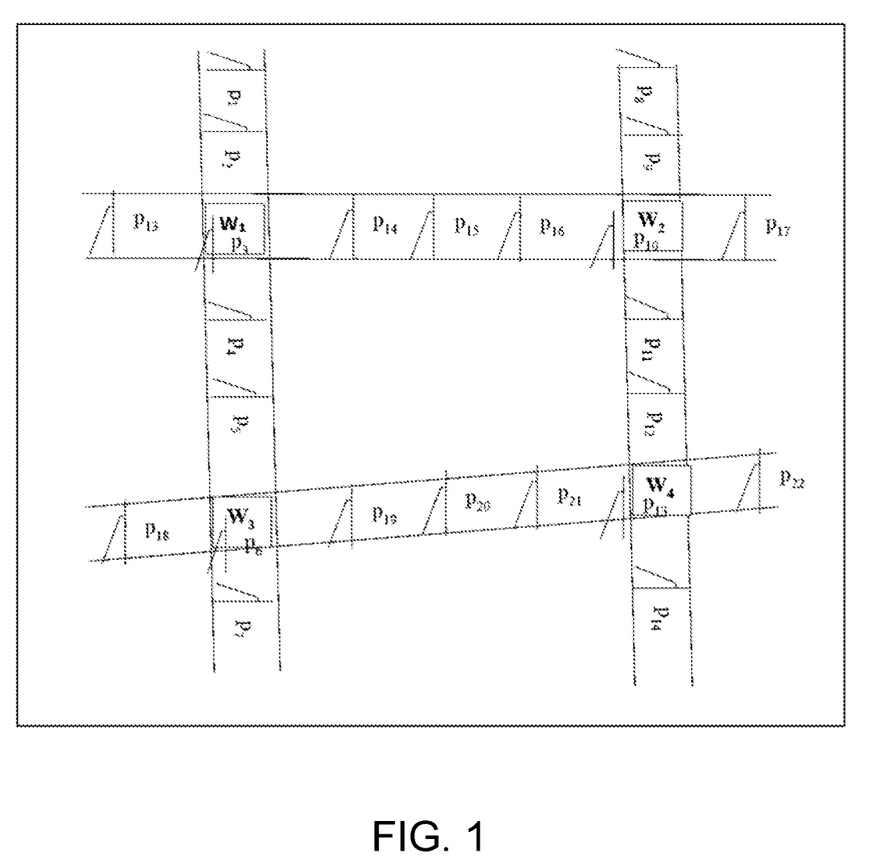
FIG. 1 shows schematically a mesh network created in the monitored area.

As can be seen in FIG. 1, in the exemplary solution, the WIFI access points are installed, if possible, at crossroads and at approximately every 300 m along long road sections without crossings. The access points form a mesh network known to those skilled in the art—see e.g. "http://en.wikipedia.org/wiki/Mesh_networking" or "http://uc-free.hu/?q=node/13" web sources—, and the access points within each other's range are mapped by running an appropriate known mesh network software. In the following, the network nodes formed by these access points will be called also peers.

The method defines, on the one hand, the moving objects by their associated, e.g. integrated or associated, devices— WIFI clients. During the process, the strength of the signals received from the monitored device at every $W_i$ access point is measured at detection points $p_i$, characterised by higher resolution than the mesh network formed of the WIFI access points, being installed at e.g. 10 m from each other between two access points. Each detection point $p_i$ is identifiable by co-ordinates in a map. The specific detection points $p_i$ are associated—provided that several measurements are made—with a set comprising vectors $[E(W_1), E(W_2), \ldots, E(W_n)]$, where $E(\ )$ means signal strength.

In the method presented here, detection points $p_i$ are assigned to a $W_i$ WIFI access point each, depending the $W_i$ access points to which the monitored device with WIFI capability is closest. The assignment can be e.g. automatic, based on the GPS data and on a map. The map can be e.g. the Google map, and the GPS data are measured and provided by the smart phone being used as WIFI client.

In Phase 1 of the present invention, a model is defined manually or automatically, that will then predict to which WIFI access point the given device or in other words WIFI client is closest, together with the relevant probability. Such a model is disclosed e.g. in the web-based source "http://ait.iit.uni-miskolc.hu/~dudas/MIEAok/Mlea10.PDF". According to the proposed method, this model can be any machine learning or statistical model, but it can also simply be a function defining the position of maximum of the signal strength. With calculation and communication via a centralised server, according to prior art, model prediction would mean that a central predictive model provides for a newly measured signal strength vector that $k=F(E(W_1), E(W_2), \ldots, E(W_n))$, where k is the index of the $W_k$ access point closest to the WIFI client concerned. Moreover, function F will not necessarily define an access point, but it can also show that the device is not in the monitored zone or it is uncertain, i.e. shall remain unclassified. Function $F(\ )$ may be in this case e.g. an artificial neural network (ANN) trained based on initial measurements, with an intermediate layer and N+1 neurons in the output layer, where N is the number of WIFI access points, and the extra output neuron is reserved for the unclassified category.

In the method provided by the present invention, the nearest access point is not defined with a model run on a central server, but with the help of a shared peer-to-peer solution. Adjacency relationship, often a mesh-structured proximity graph, is defined between the specific $W_i$ access points (mesh). Every peer node models by its proper representation (e.g., neural network or any of the previously mentioned general models) whether it is the one that is closest to a given object with WIFI capability or associated with such device located at a given detection point $p_i$. This is how, based on the signal strength vectors originating from the adjacent peers and its own measurements, it decides whether an object is closest to it and with what probability (where a neural network is applied, that will provide a real point value).

Figure 2:
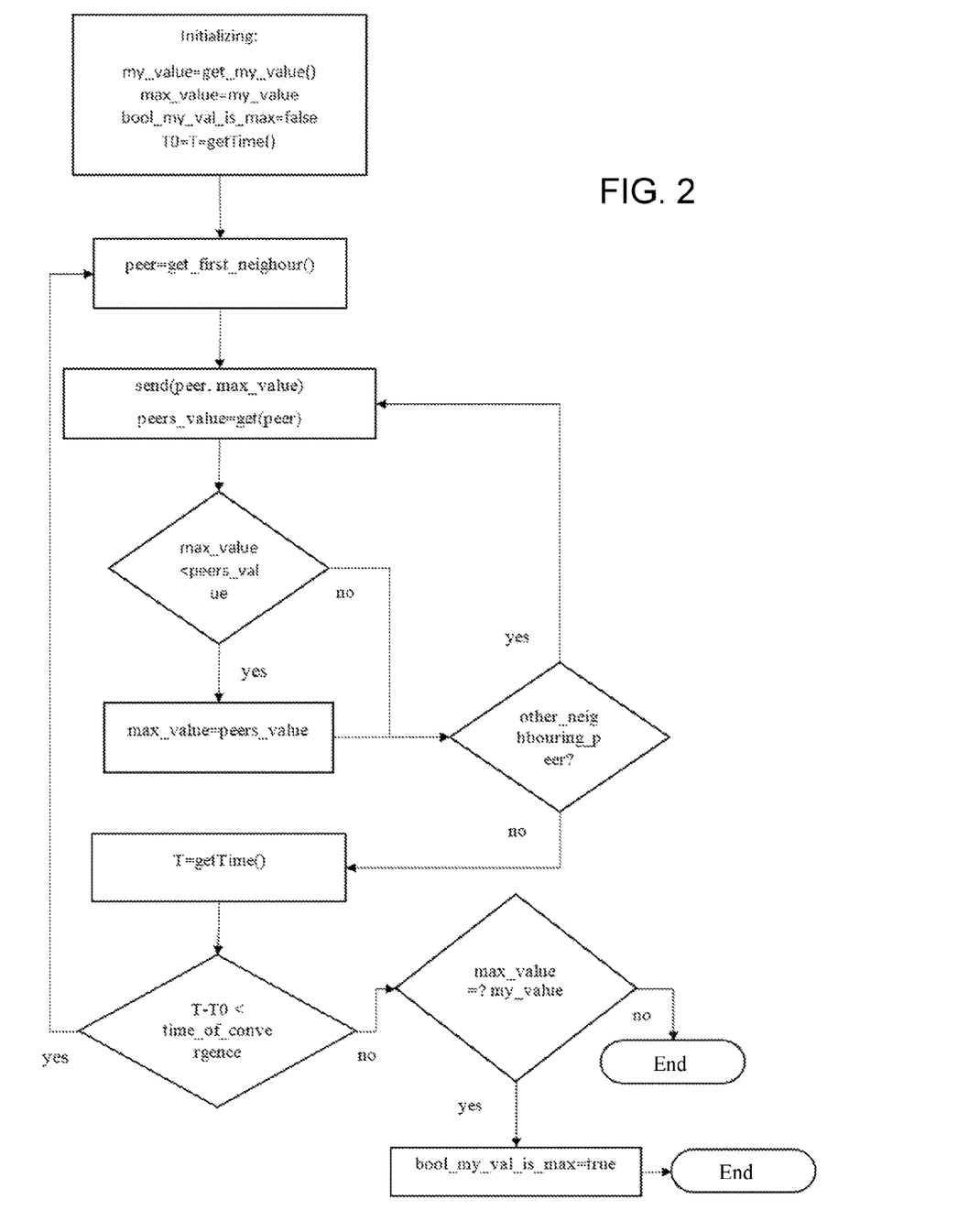
FIG. 2 shows a flowchart of a possible selection strategy of the shortest distance between client and P2P entities.

Consequently, in the present invention one may decide by peer node to which access point a given object emitting a WIFI signal is nearest, based on a short communication with the adjacent entities, according to the flowchart presented in FIG. 2 referring to an access point forming a node: this is the strategy for selecting which P2P element contains the maximal value.

It is an essential feature of the invention that conclusions will be drawn exclusively on the basis of the observation of moving objects; the evaluation of non-moving hardware devices looking for WiFi access points is to be avoided, as these devices do not count in the analysis of the traffic.

In the present invention, motion is the starting point of the analyses. The inference to motion is based on the measurable and measured change of the nearest WIFI access point associated with the object. Where the nearest access point remains identical, no movement takes place, or if it did, it could not be detected by the method and system of devices shown here.

Phase 2 of the present invention, i.e., that of its use, is a P2P based movement analysis, meaning the following in more detail. Considering the foregoing, every peer node has a list comprising the WIFI client that is closest to it. The WIFI client is identified in the present case on the basis of its unique MAC address or the extracted value of the latter, included in every communication message packet, cf. e.g. the internet reference: "http://www.wildpackets.com/resources/compendium/wireless lan/wlan packets". Any major movement of the WIFI client entails some change: according to the next evaluation of the models, the WIFI client will already be closest to an adjacent access point, and that access point will define, based on communication with the adjacent access points, the one to which the object used to be nearest. Thus it is possible to generate a "history" for each node of the WIFI clients closest to it that will comprise the previous AP nodes and the appropriate measurement time stamps, i.e. when the WIFI client was closest which node. This history is easy to construct by P2P communication, by querying the neighbours, and by expanding the history with own data.

Figure 3:
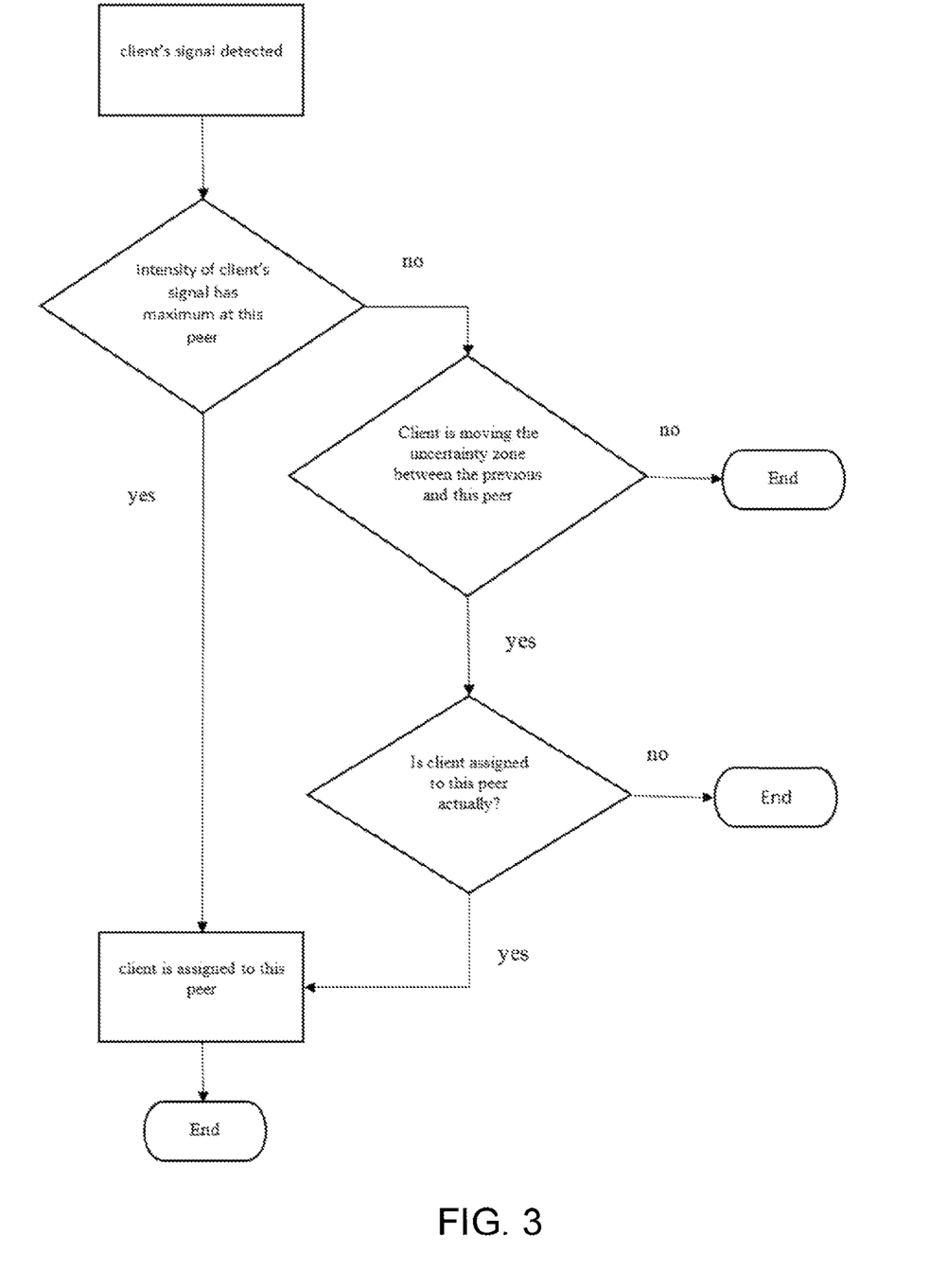
FIG. 3 shows the flowchart of a possible way to designate an assignment of the client to a peer in a zone of uncertainty.

The present invention may also offer a solution for the case when the previously outlined location determination becomes noisy due to the movement of the WIFI client. This may happen when the WIFI client reaches a boundary point where it is assigned to a new closest access point. It may happen that assignment to an access point keeps changing back and forth between one or several access points due to signal fluctuation, noise and/or uncertainty. To solve the problem, a "zone of uncertainty" is designated, with an appropriate number of detection points $p_i$ between the specific access points. The uncertainty zone is modelled separately. A history taking into consideration the uncertainty zone is constructed as follows: the zone of uncertainty will belong to the previous access point up to the point when the WIFI client is assigned to another definite access point for the first time; from that time on, the uncertainty zone belongs to the next access point, as is shown in FIG. 3.

According to a preferred embodiment of the method according to the invention, the objects to be analysed henceforth are only the ones, in each node, that have a history, that is, the history of which mentions previous nodes, whereas the other data are static, that is, they mean a stationary WIFI or object, and are therefore irrelevant in terms of the present objective.

The method according to the present invention allows to analyse historical data accumulating in the nodes, during which it is possible to estimate such informative data as traffic density and waiting time. Histories present in a node concurrently allow to calculate many essential parameters, and to define traffic speed, and infer to the role of the traffic participant (motorist, pedestrian, public transport passenger) on that basis. Since the distances of the peers are known, the approximate distances of the points where, along a given trajectory, an object gets closer to another peer, are known as well, so it is possible to calculate average speed by section, and it is possible to estimate maximum average speed by calculating the differential of the distance and the corresponding time stamps. Similarly, waiting time by peer node can also be calculated.

In another preferred embodiment of the method according to the present invention, the specific movement categories such as pedestrian, public transport or other motorist, are separated. This may be necessary to prevent the aggregation of all average speed or waiting time data associated with the antecedents (history) that would lead to false results. This may be realised, for example, in the following way:

First public transport vehicles will be separated. Based on the designated route of a public transport vehicle, it is possible to identify one or several WIFI clients with a trajectory history showing close correlation with the former, e.g. the communication devices of passengers travelling through several stops. By comparing the history, average speed and time stamp of these WIFI clients to the history content of the other clients assigned to the same AP node, one can define the other public transport user WIFI clients. This operation is feasible for the trajectory of every public transport vehicle contacting the given access point.

The majority of the remaining movements define the motion of WIFI clients aboard vehicles or held by pedestrians. The set of the histories of these clients is divided into two clusters by a clustering method based on estimated average speed (e.g. k-means or-center or information gain). Such clustering method is disclosed for example in the document shown in the website "http://www-users.cs.umn.edu/~kumar/dmbook/ch8.pdf": if the division does not seem appropriate, the conclusion to be drawn is that the speed of the vehicle (convoy) does not differ significantly from that of the pedestrians.

Figure 4A:
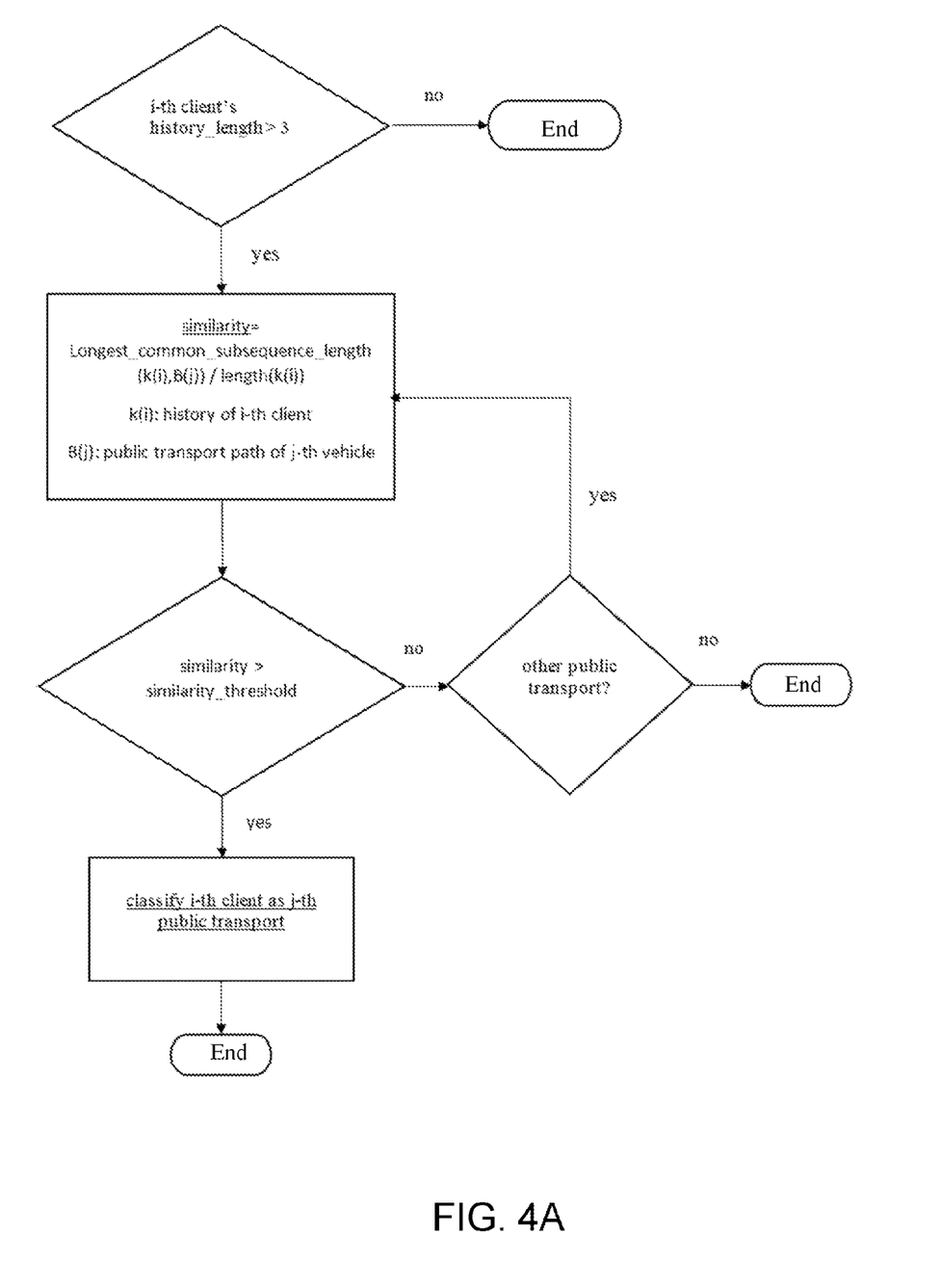
FIGS. 4A and 4B show a flowchart of a possible decision-making process for division.
Figure 4B:
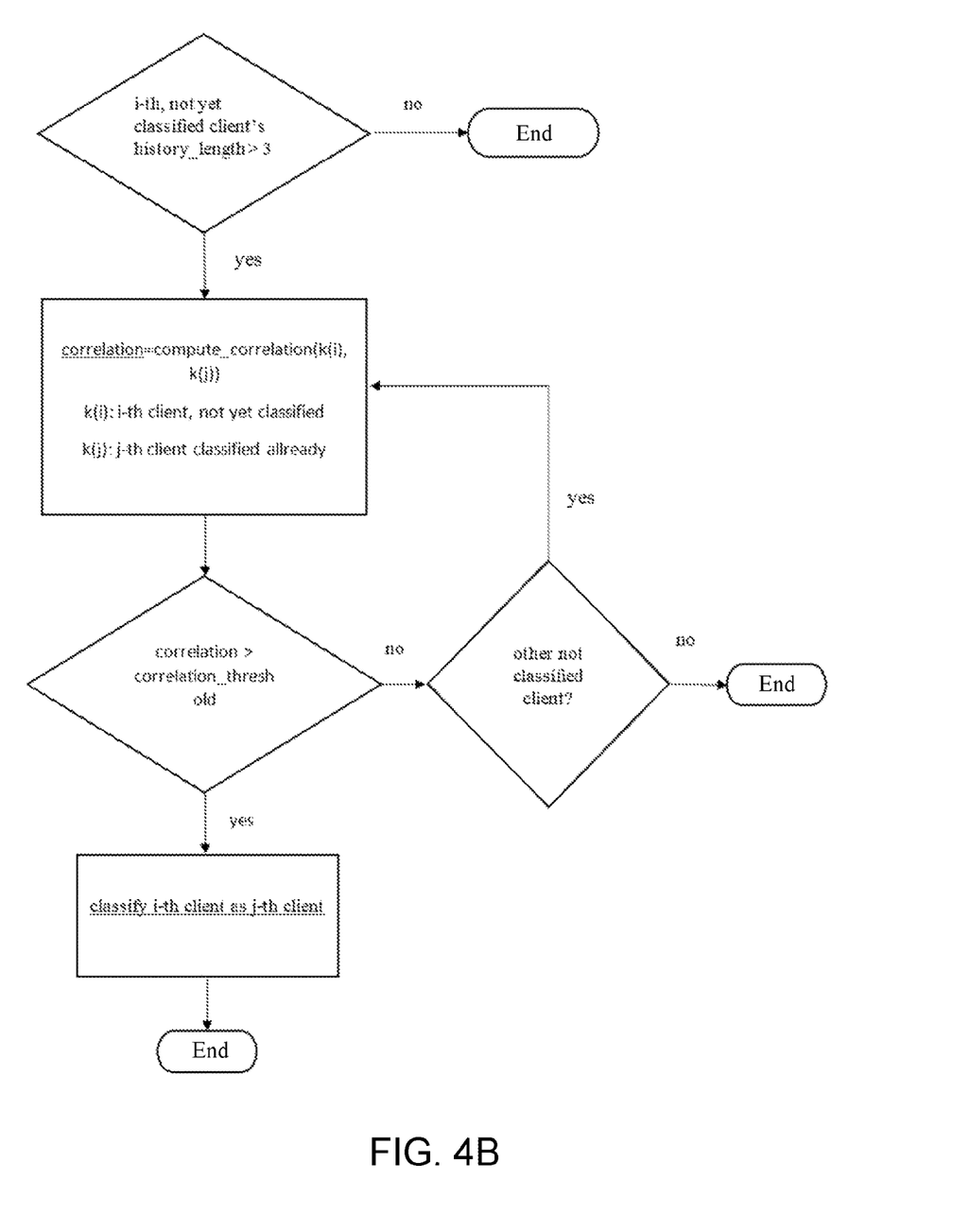
Figure 5:
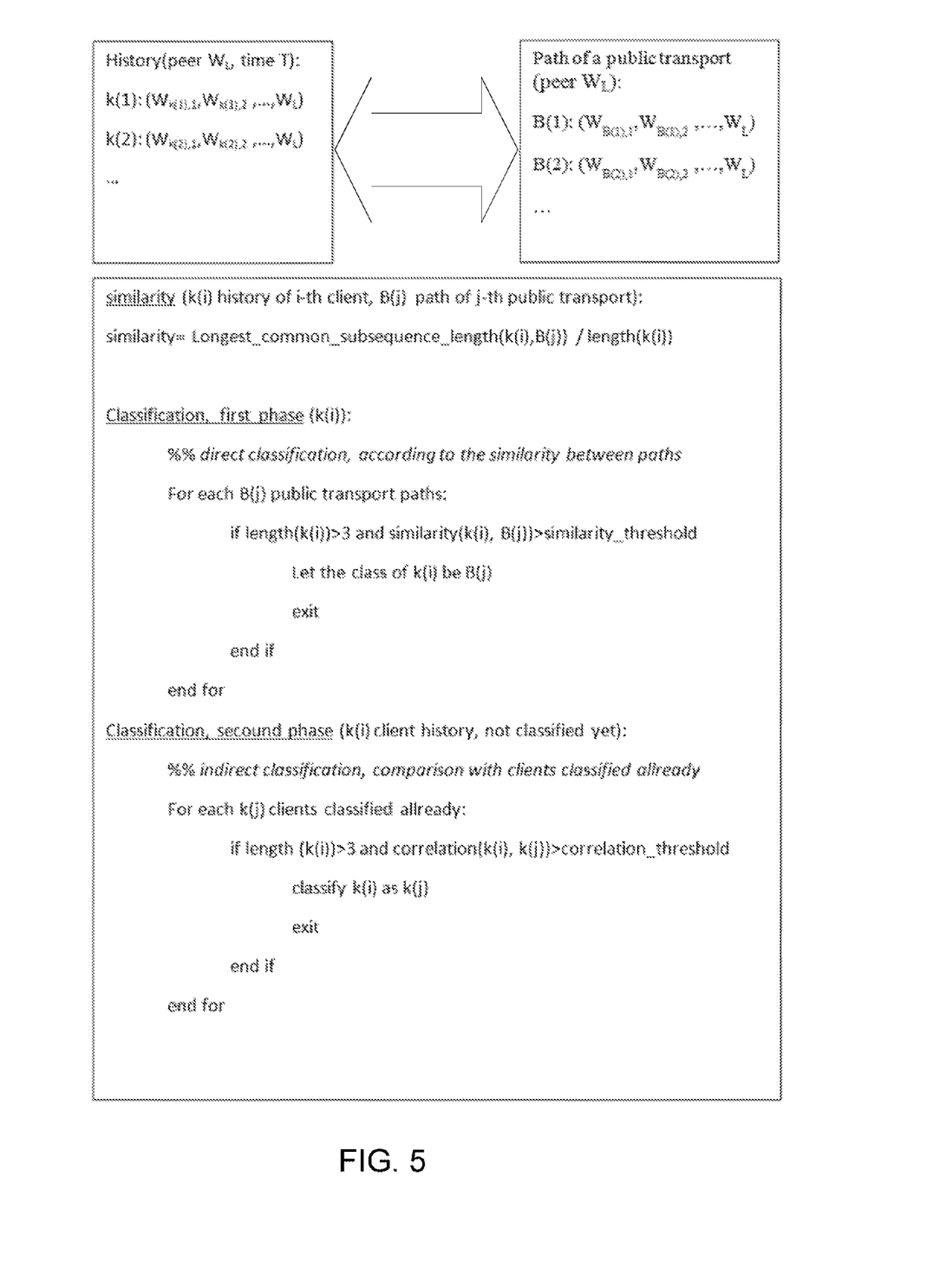
FIG. 5 presents a possible pseudo code of the process presented in FIGS. 4A and 4B.

One specific result of the application of the method according to the invention is the under-standing of the estimated number, estimated average speed and average waiting time of the moving objects broken down by movement type, on the basis of which the data can also be aggregated at daily level by AP node. FIGS. 4A, 4B and 5 outline how, by spreading the conclusions at the specific AP nodes over the mesh network, all data will become available and accessible finally at any of the nodes.

The invention claimed is:

1. A method for tracking the movement and trajectory of objects associated with wireless communication devices, located in a predefined area, wherein
   access points functioning according to a small-range wireless communication standard and used as transceiver nodes communicating with the wireless communication device are installed in a predefined area relative to each other at a distance suitable for carrying out "peer-to-peer" (P2P) type wireless communication with each other,
   the objects to be tracked, each associated with an own wireless communication device entering or located in the range of the transceiver nodes are detected and processed by the latter in a manner that the position of the monitored object in the range of at least two access points is defined by the access points with a resolution exceeding that of a detection mesh network formed by the access points, wherein strength of relevant signal emitted by the wireless communication device associated with each object will be measured during communication by the at least two access points and converted into a vector set,
   objects that are communicating but make no movement will be selected and filtered out by evaluating the vector set,
   the movement of the communicating objects changing their place will be analysed by applying a pre-defined mathematical model,
   at least one element of a data group comprising the fact of the detection, the number of the detected objects and the trajectory of the detected moving objects is stored,
   the stored information is made available for further processing,
   realizing data collection, data analysis and evaluation without the need of any central server, in a P2P (Peer to Peer) way via on-site processing and local P2P communication,
   based on the fact that adjacency relationship is defined between specific access points, modelling at each access point by its proper representation whether a device associated with an object with WIFI capability is located nearest to said respective access point, and
   determining by said respective access point based on the signal strength vectors originating from the adjacent peers and its own measurements, whether the object associated with the device is closest to it, as well as the probability of the result of said determination.

2. Method according to claim 1, wherein the pre-defined area is associated with a co-ordinate system, and the position of the object is defined by the parameters of said co-ordinate system.

3. Method according to claim 1, wherein the detected objects are identified based on their selected identifier parameter.

4. Method according to claim 3, wherein the individual objects are identified by their respective unique MAC addresses.

5. Method according to claim 4, wherein the MAC addresses are anonymised before their utilisation.

6. Method according to claim 1, wherein access points functioning according to the WIFI or BLUETOOTH or ZIGBEE or NFC wireless communication standard or recommendation are applied.

7. Method according to of claim 1, wherein the access points are installed in a distance of not more than 300 m from one another.

8. Method according to claim 1, wherein the access points are installed at traffic nodes.

9. Method according to claim 1, wherein the access points are installed at road crossings or junctions.

10. Method according to claim 1, wherein the detected objects are grouped on the basis of their trajectory.

11. Method according to claim 1, wherein the detected objects are categorised on the basis of at least one of their trajectory or the results of the applied mathematical model.

12. Method according to claim 11, wherein the objects are assigned to the categories of "pedestrian" or "associated with vehicle".

13. Method according to claim 12, wherein the "associated with vehicle" category is subdivided into public and private vehicle transport, respectively.

14. Method according to claim 12, wherein assignment to the categories of "pedestrian" and "associated with vehicle" is done one the basis of the monitoring and evaluation of the speed parameter of the monitored object.

15. Method according to claim 1, wherein one or several pre-defined uncertainty zones are associated with the access points in order to eliminate false data due to noise.

16. A method for tracking the movement and trajectory of objects associated with wireless communication devices, located in a predefined area, said method comprising
    installing access points functioning according to a small-range wireless communication standard and used as transceiver nodes communicating with the wireless communication device in a predefined area relative to each other at a distance suitable for carrying out "peer-to-peer" (P2P) type wireless communication with each other,
    detecting and processing the objects to be tracked, each associated with an own wireless communication device, entering or located in the range of the transceiver nodes, wherein said detecting and processing is by transceiver nodes in a manner that the position of the monitored object in the range of at least two access points is defined by the access points with a resolution exceeding that of a detection mesh network formed by the access points, wherein strength of relevant signal emitted by the wireless communication device associated with each object is measured during communication by the at least two access points and converted into a vector set,
    selecting and filtering out objects that are communicating but make no movement, by evaluating the vector set,
    analysing the movement of the communicating objects changing their place by applying a pre-defined mathematical model,
    storing at least one element of a data group comprising the fact of the detection, the number of the detected objects and the trajectory of the detected moving objects,
    further processing the stored data,
    wherein the said analysing, storing and further processing are realized without any central server, in a P2P (Peer to Peer) way via on-site processing and local P2P communication,
    based on the fact that adjacency relationship is defined between specific access points, modelling at each access point by its proper representation whether the wireless communication device associated with each object is located nearest to said respective access point, and
    determining by said respective access point based on the signal strength vectors originating from adjacent access points and its own measurements, whether the object associated with the device is closest to it, as well as the probability of the result of said determination.

17. The method of claim 16 wherein the wireless communication devices associated with the objects have WIFI capability.

* * * * *